United States Patent [19]
Futch et al.

[11] Patent Number: 4,954,760
[45] Date of Patent: Sep. 4, 1990

[54] SELF LEVELING DISPENSER

[75] Inventors: Max G. Futch, 322 Wilton Dr., Baton Rouge, La. 70895; Ronald H. Drushel, Baton Rouge, La.

[73] Assignee: Max G. Futch, Baton Rouge, La.

[21] Appl. No.: 411,668

[22] Filed: Sep. 25, 1989

Related U.S. Application Data

[62] Division of Ser. No. 264,089, Oct. 28, 1988.

[51] Int. Cl.$^5$ .................. B65G 1/07; A47F 10/06
[52] U.S. Cl. .................... 318/480; 318/265; 318/286; 318/467; 211/1.5; 211/59.3; 414/796.7
[58] Field of Search ............ 318/256, 265, 266, 283, 318/286, 466, 467, 468, 470, 480, 558; 414/792.7, 794.1, 794.9, 795.2, 795.7, 795.8, 796.6, 796.7, 797.5, 331; 211/1.5, 41, 59.3, 126, 133, 134, 175, 207, 209

[56] References Cited

U.S. PATENT DOCUMENTS

| | | |
|---|---|---|
| 765,347 | 7/1904 | Vogel . |
| 1,566,223 | 12/1925 | Manor . |
| 2,586,351 | 2/1952 | Larimore . |
| 2,614,012 | 10/1952 | Yuan . |
| 2,816,808 | 12/1957 | Haines ................ 211/59.3 X |
| 3,035,835 | 5/1962 | Reif et al. ............ 414/796.7 X |
| 3,361,510 | 1/1968 | McDermott . |
| 3,537,745 | 11/1970 | Herring, Jr. . |
| 3,568,804 | 3/1971 | Olsen . |
| 3,799,292 | 3/1974 | Katz . |
| 4,312,172 | 1/1982 | Fisher et al. . |
| 4,357,127 | 11/1982 | Kooiman ............. 211/59.3 X |
| 4,568,132 | 2/1986 | Watt . |
| 4,592,485 | 6/1986 | Anderson et al. ...... 414/796.7 X |
| 4,629,072 | 12/1986 | Loew ................. 211/59.3 |

FOREIGN PATENT DOCUMENTS

| | | | |
|---|---|---|---|
| 60-161831 | 8/1985 | Japan .................. 414/797.5 |
| 1375702 | 2/1988 | U.S.S.R. ............... 211/1.5 |
| 2084120 | 4/1982 | United Kingdom ....... 211/1.5 |

OTHER PUBLICATIONS

Trade Literature, Serv-O-Lift Corp., Dorchester, MA 02125.
Trade Literature, AMF Wyott Inc., Cheyenne, WY.
Trade Literature, Shelley Manufacturing Co., Miami, FL.
Trade Literature, Caddy Corp. of America, Pitman, NJ.
Trade Literature, Lakeside Mfg. Inc., Milwaukee, WI.

Primary Examiner—Bentsu Ro
Attorney, Agent, or Firm—Wood, Herron & Evans

[57] ABSTRACT

A self-leveling dispenser provides a rack supporting a stack of trays within a frame. A reversible motor drivably connected to spiral shafts mounted at the corners of the frame rotates the shafts to provide upward or downward movement of the rack, which is supported on the spiral shafts by threaded sleeves. An upper sensor mounted to the frame is operably connected to the motor to move the rack downward upon detecting a tray at an upper horizontal level above a desired height. A lower sensor mounted to the frame is operably connected to the motor to raise the rack upon sensing the absence of a tray at a lower horizontal level below the desired height. The sensors cooperate to automatically and continuously reposition an uppermost portion of a top tray in the stack at the desired height with respect to the frame, thereby to facilitate dispensing of dishes or food products.

4 Claims, 3 Drawing Sheets

SELF LEVELING DISPENSER

This is a division of application Ser. No. 264,089, filed Oct. 28, 1988.

FIELD OF THE INVENTION

This invention relates to dispensers and, more particularly, to automatic self-leveling dispensers.

BACKGROUND OF THE INVENTION

Over the course of a typical day, cafeterias generally use, wash and re-use a large number of dishes, e.g., plates, cups, and glasses on a continuous basis. A series of manually portable dishware trays, each providing a number of top opening compartments sized to receive one or more pieces of dishware, is often used by the cafeteria to facilitate dispensing of the dishes to retail customers. The trays are usually sized and structured to be stacked vertically one on top the other in the cafeteria line.

Dishware dispensers are well known to the prior art. A dishware dispenser supports a number of stacked dishware trays upon a rack within a box-like, mobile frame. When the supply of dishes, e.g., glasses, in the top tray is exhausted, the top tray is removed to provide access to glasses in the tray immediately below. Subsequent exhaustion of glasses in the tray just below requires removal of that tray, and so on. Eventually, this results in an empty dishware dispenser, whereupon another stack of trays containing clean dishes is placed upon the rack.

Self leveling dishware dispensers are known which provide a rack that is vertically movable with respect to the frame. The rack, in commercial embodiments of which we are aware, is spring biased upwardly to maintain the top dish tray in the stack at a relatively constant height regardless of the number of trays in the stack. As the weight of the stack decreases, i.e., as dishes and trays are removed, a spring mechanism forces the rack upward until a new equilibrium is reached between tray weight and spring force. Theoretically, this should place the top tray at the desired height for use by the customer.

A significant inherent problem exists in maintaining the proper dispensing height of a self leveling dishware dispenser of the spring elevated type. This problem occurs as a result of improperly filled trays, partially filled trays, and changing weights and sizes of dishware items to be dispensed. So designers, contractors and suppliers must continuously verify the sizes and weights of the items to be dispensed in order to properly size the dishware dispenser's spring mechanism. In other words, the performance of such prior art dishware dispensers depends upon proper initial spring calibration, and reliable adjustment mechanisms, which allow spring adjustment after the dispenser has been in use for a period of time. Otherwise, the dispenser will not be properly responsive to the trays from which dishware is to be dispensed.

Accordingly, it is the objective of this invention to provide an improved self-leveling dispenser which overcomes the disadvantages associated with dishware dispensers of the spring mechanism type.

SUMMARY OF THE INVENTION

A self-leveling dispenser, according to a preferred embodiment of the invention, includes a rack for holding stacked trays, vertical spiral drive shafts, a reversible motor, a chain and sprocket assembly, and tray position sensors. The spiral drive shafts are located at the rack's corners and rotate relative thereto. The rack is supported upon the shafts by followers fixed to the rack. The chain and sprocket assembly drivably connects the motor to all the drive shafts to raise or lower the rack as the shafts are rotated by the motor.

Upper and lower tray sensors are connected with the motor and operate to maintain the top tray at the desired dispensing height. Upper and lower travel limit switches are located at the upper and lower ends of the shafts, respectively, to prevent over travel of the rack into the frame. An override circuit which connects the sensors to the motor prevents both an "up" and a "down" signal from being simultaneously transmitted to the motor.

In use, and upon detecting the presence of a tray newly placed on top a tray stack where the previous top tray is at the desired dispensing height, the upper tray sensor signals the motor to rotate the shafts so as to lower the rack a distance about equal to the height of that tray, thereby lowering all the trays on the rack until the newly placed tray becomes the top tray at the desired dispensing height. Upon detecting the absence of a tray at the desired dispensing height such as would occur when an empty tray has been removed, the lower sensor signals the motor to rotate the shafts so as to raise the rack a distance about equal to the height of the new top tray that remains on the rack, thereby raising all the trays on the rack until the new top tray is at the desired dispensing height. So the upper and lower sensors cooperate to automatically and continuously reposition a new top tray on the stack of trays at the desired dispensing height regardless of the number of trays in the stack, and regardless of whether the new top tray is a full tray manually added to the top of the tray stack in the dispenser or is a full tray already in the tray stack which is exposed when an empty tray is manually removed from the top of the tray stack.

More specifically, with no trays stacked upon the rack, the rack is located at an uppermost position relative to the spiral shafts. Under normal conditions, this uppermost position is below the upper sensor because the upper sensor would signal the motor to lower the rack until nothing is sensed by the upper sensor. If the upper sensor fails, the rack's uppermost position will be the level at which the upper limit switch stops upward movement of the rack. If desired, the upper limit switch may be positioned to detect and stop the rack prior to its being raised to the upper horizontal level. Placement of a stack of trays upon the rack causes the upper sensor to detect the presence of a side of a tray at the upper sensor level and to signal the motor to rotate the shafts to move the rack downward. The rack will move downward so long as any tray is detected by the upper sensor, i.e., until the top tray on the stack has moved below the upper sensor. If too many trays are stacked onto the rack at one time, i.e., if the stack is too tall for the travel path length of the rack, downward movement of the rack will continue only until the rack contacts the lower travel limit switch to disengage the motor. No further movement of the rack will occur until enough trays have been removed from the stack to activate the lower sensor. With the lower sensor activated, the motor operates to raise the rack until a tray is detected by the lower sensor. When the top tray at the desired height has been emptied and removed, the next tray will be automatically raised to the desired height, and so on until further upward travel of the rack is inhibited by either the upper limit switch or the upper sensor.

The automatic self-leveling dispenser of this invention provides dishware or food product dispensing at a relatively constant desired height regardless of variation in the weight or types of items being dispensed. Moreover, while a spring activated dishware dispenser requires occasional recalibration of its springs, this automatic dispenser does not require any type of recalibration to dispense dishware or food products at the desired height.

These and other advantages of the invention will be more readily understood in light of the following detailed descriptions and the drawings in which:

DETAILED DESCRIPTION OF THE DRAWINGS

Figure 1:
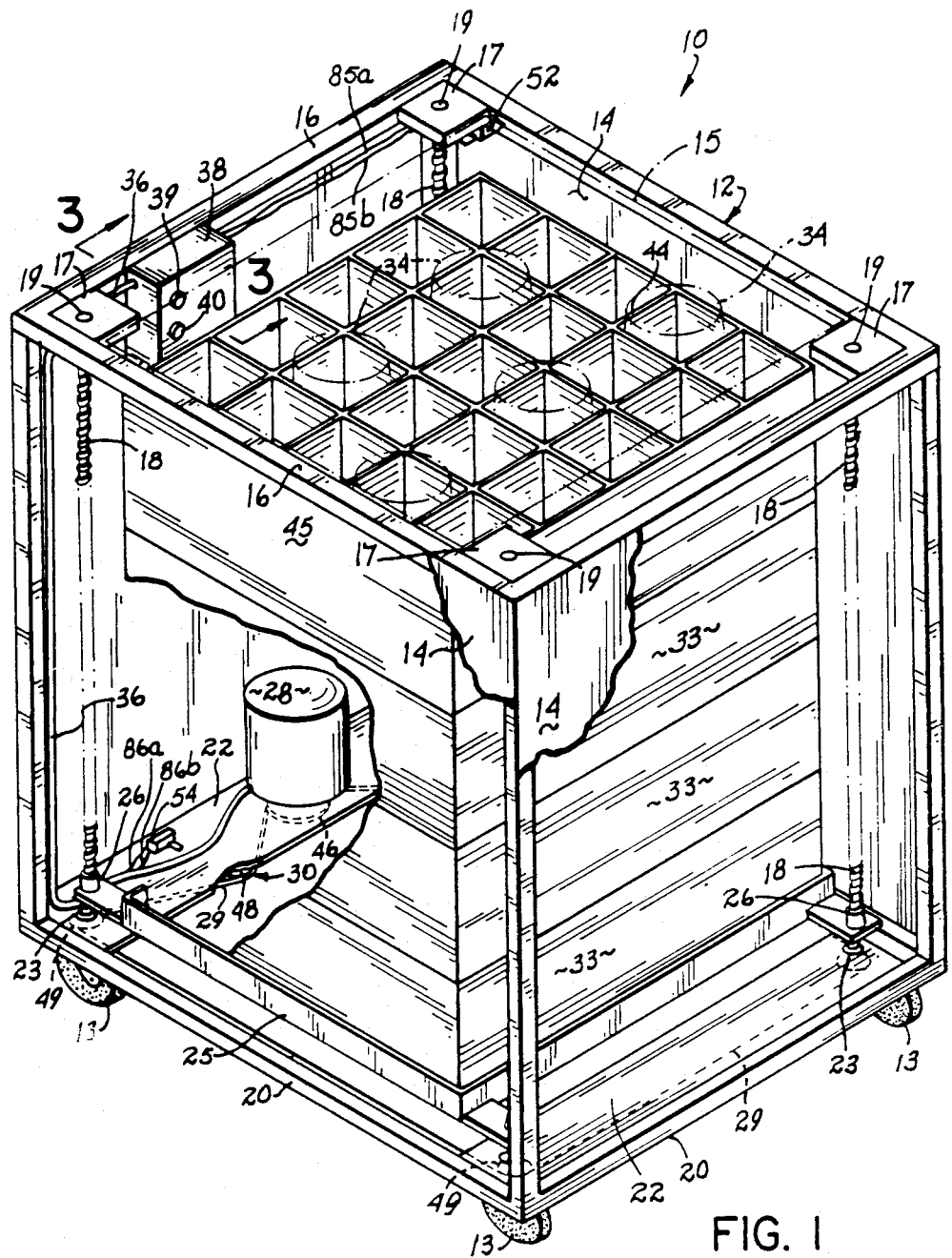
FIG. 1 is a partially cut away perspective view of an automatic self-leveling dish dispenser according to a preferred embodiment of the invention.

FIGS. 1–4 show an automatic self-leveling dispenser 10 according to a preferred embodiment of the invention. As shown in FIG. 1, a box-like frame 12 provides exterior structural support for the dispenser 10. Preferably, frame 12 is mounted on casters 13. Outer walls 14 and top wall 15 enclose the frame 12, and the top primarily remains open to manual access for receipt of trays 33. The frame 12, walls 14 and top 15 are preferably metal, though any structurally rigid material will suffice.

Adjacent a top portion 16 of the frame 12, horizontally disposed plates 17 extend inwardly to mount spiral drive shafts 18 to the frame 12 by top roller bearing bushings 19. At the bottom 20 of the frame 12, the spiral shafts 18 are supported on base platforms 22 by bottom roller bearing bushings 23. The roller bearing bushings 19 and 23 render the shafts 18 rotatable with respect to the frame 12. A rack 25 is supported upon the shafts 18 by four threaded followers or sleeves 26 fixed to the rack, and the rack 25 can be moved upwardly or downwardly by rotating the shafts 18. Rack 25 supports a desired number of trays 33 in stacked arrangement. The trays 33 are typically plastic, and are open at the top to permit access to dishware, e.g., glasses 34, or to food products, e.g., individual serving milk cartons (not shown), located therein. In this application, the term "dishware" is meant to refer to cups, bowls, glasses, mugs, plates, etc. Also in this application, the term "tray" is meant to refer to a reusable carrier within which dishware or food product can be placed, as well as a non-reusable carrier such as a box or carton within which food products, e.g., ice cream bars or popsicles, are packaged and/or shipped.

Figure 2:
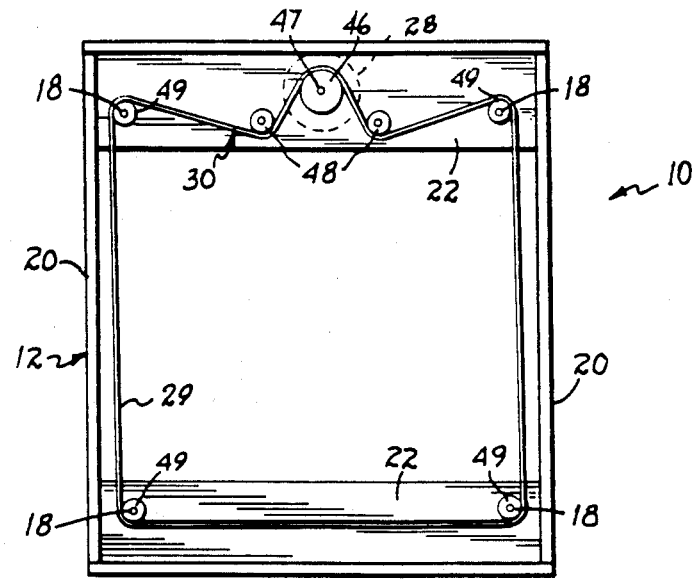
FIG. 2 is a bottom plan view of the automatic dishware dispenser shown in FIG. 1.

As shown in FIG. 2, a motor 28 is drivably connected to the spiral drive shafts 18 by a chain and tension sprocket assembly 30. The chain 29 of this assembly is oriented in a horizontal plane positioned beneath the horizontal rack 25, and connects with each shaft 18 by a driven sprocket 49. Thus, rotational movement of the motor 28 is imparted to all the shafts 18 by chain 29 to raise or lower rack 25. A motor sprocket 46 mounted on motor shaft 47 rotates with the motor shaft 47 to impart either clockwise or counterclockwise (as viewed in FIG. 2) motion to chain 29. Two tension sprockets 48 direct chain 29 to the four corner sprockets 49.

Figure 3:
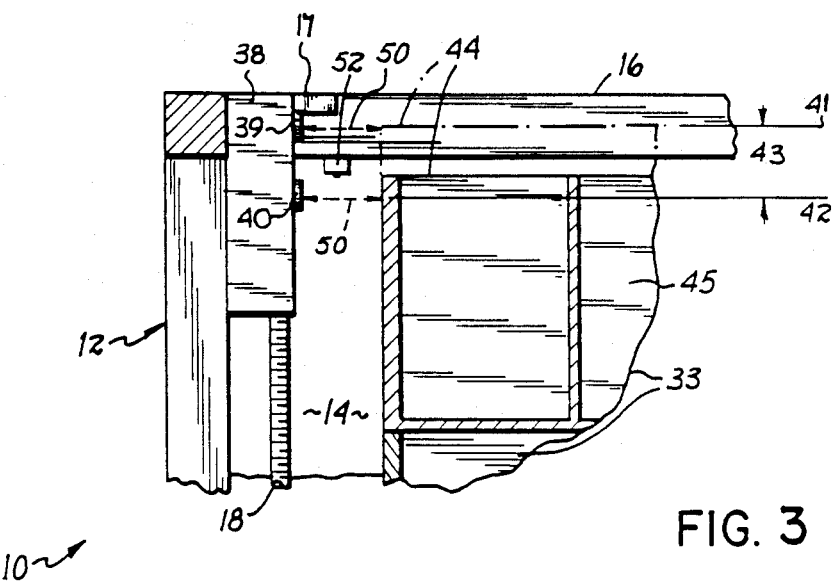
FIG. 3 is a cross-sectional view taken along line 3—3 of FIG. 1

An electrical conduit 36 carries electrical connections from the motor 28 to a housing 38 mounted adjacent top portion 16 of the frame 12. The housing 38 houses sensing means in the form of an upper infrared sensor 39 and a lower infrared sensor 40 in spaced vertical relation, same being located at the desired dispensing height for the glasses 34. As shown in FIG. 3, upper sensor 39 is located at an upper level 41, and lower sensor 40 is located at a lower level 42. The gap between upper and lower levels 41 and 42 defines the desired dispensing height 43 at which a top tray 45 in the stack will reside.

Upon detecting the presence of a tray at upper level 41, upper sensor 39 signals the motor 28 to lower rack 25. Motor 28 continues to lower rack 25 until the top edge 44 of the top tray 45 moves below upper level 41, i.e., until the top tray 45 moves below upper sensor 39, whereupon power to motor 28 is disconnected and lowering movement of the rack is stopped. When the supply of glasses 34 or food product residing in the top tray has been exhausted, an operator removes the top tray, thus vacating the lower level 42. Upon detecting the absence of a tray at the lower level 42, lower sensor 40 signals the motor 28 to raise the rack 25 until top edge 44 of the next tray in the stack has moved into level 42, whereupon power to motor 28 is disconnected and raising movement of the rack is stopped.

An upper limit switch 52 prevents upward over travel of rack 25 into the frame 12, as explained previously. Switch 52 is actuated upon contact with the rack 25 and is preferably mounted to an underside of top portion 16, just above upper level 42, as shown in FIG. 3. If the lower sensor 40 continues to transmit a raise signal despite the presence of the rack 25 at the lower level 42, and the rack 25 raises beyond level 42 into contact with switch 52, the motor 28 will be disconnected. Similarly, a lower limit switch 54, also actuated by contact, is mounted to one of the plates 22 to prevent downward over travel of rack 25 into the frame 12. Limit switch 52 is connected to electrical circuitry in housing 38 via conductors 85a and 85b. Similarly, limit switch 54 is connected to electrical circuitry in housing 38 via conductors 86a and 86b.

Although a particular frame height will dictate a preferable number of trays for stacking within the frame 12, additional trays may be stacked above upper level 41 if desired. Such overstacking will eventually activate switch 54 and stop the motor 28 because the rack 25 will not be able to move downward far enough to place the top tray below level 41. The upper stacked trays 33 will remain in place, and no up signal will be provided until all of the stacked trays located above the lower level 42 have been removed.

Figure 4:
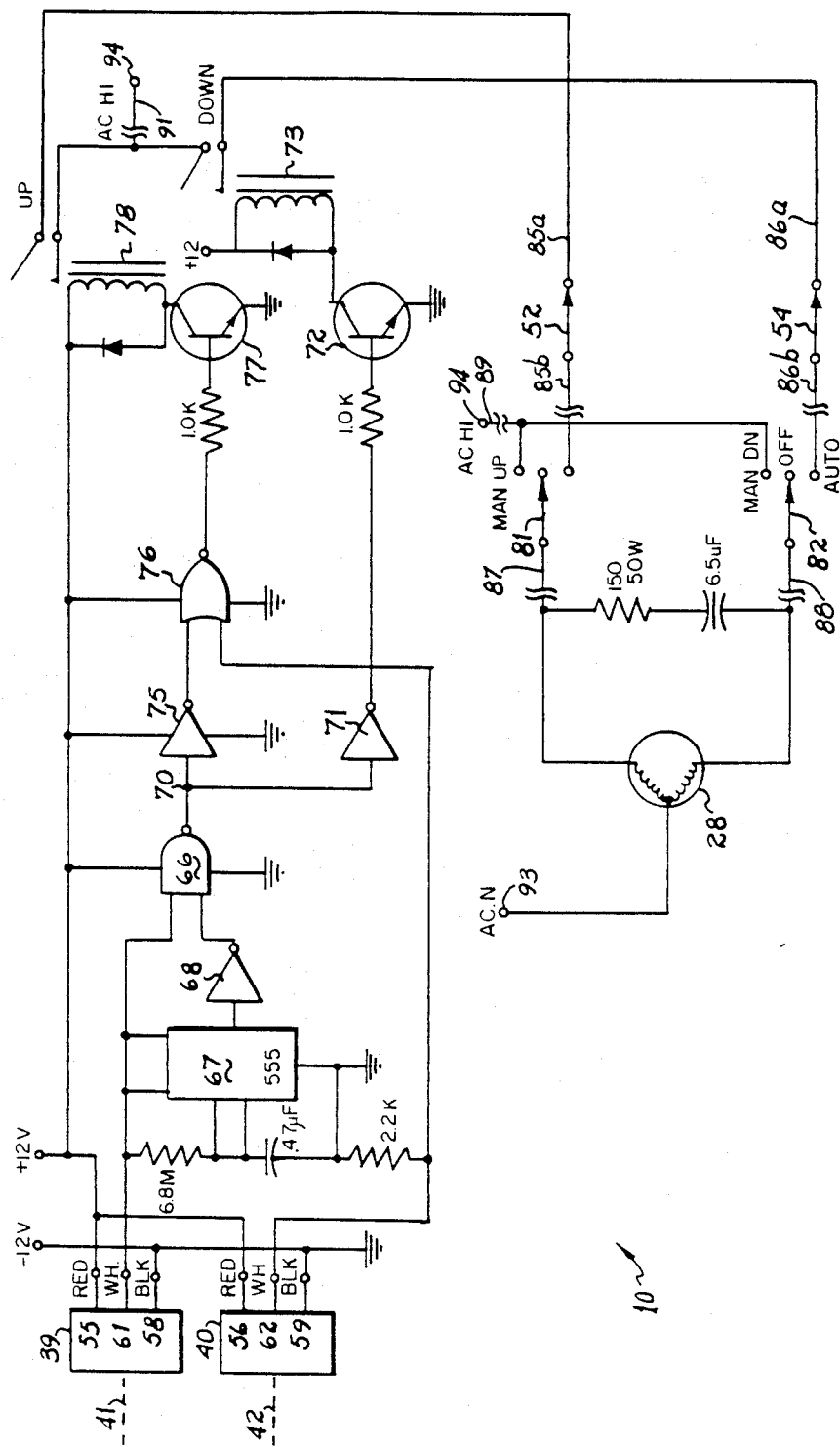
FIG. 4 is a diagram showing the electronic circuitry connected between the upper and lower sensors and the motor for the dishware dispenser shown in FIG. 1.

A circuit schematic showing the electrical circuit components connected between the upper sensor 39 and the lower sensor 40 and motor 28 to provide the desired lowering and raising of rack 25 is shown in FIG. 4. Each of the sensors 39, 40 is preferably a photoelectric sensor having both a transmitter and a receiver to cooperatively sense transparent or opaque objects within a predetermined horizontally directed range 50, preferably about 4'. A component manufactured and sold by Omron as Catalogue No. E3F has proved to be a suitable photoelectric sensor for the purposes of this invention. The sensors 39 and 40 have first terminals 55 and 56, respectively, connected to a +12 volt power source, and third terminals 58 and 59, respectively, connected to −12 volts. A middle terminal 61 of sensor 39 is simultaneously input to a NAND gate 66 and a 555 timer 67. The timer 67 incorporates a time delay factor into the circuit to prevent instantaneous raising or lowering of the rack 25 upon sensing the inadvertent and/or temporary placement of a hand or other object within the detection range 50.

The timer 67 inverts the signal and inputs it to an inverter 68 which inverts it again before input into NAND gate 66. Upon detecting an object at the upper horizontal level 41, both inputs to NAND gate 66 will be high resulting in a low output at node 70. This low output is inverted by inverter 71 and input to transistor 72, causing it to conduct and to close normally open relay 73. Closing of relay 73 causes the motor 28 to rotate the shafts 18 for downward movement of the rack 25. Movement will continue so long as a tray presence is sensed by sensor 39, or until lower limit switch 54 detects the rack 25 and opens the circuit.

During downward movement of rack 25, a low signal at NAND gate 66 produces a high signal out of inverter 75 to insure a low output for NOR gate 76, thus preventing transistor 77 from conducting. Conduction through transistor 77 controls the position of normally open relay 78, which connects power to the motor 28 to raise the rack 25. Thus, this circuit provides an override safety feature which prevents the simultaneous signalling to the motor 28 to both raise and lower the rack 25. So long as upper sensor 39 senses an object at upper level 41, regardless of what is sensed by lower sensor 40, transistor 72 will conduct and transistor 77 will not conduct, thus lowering the rack 25.

When the top edge of a top tray has moved below the upper level 41, the output to NAND gate 66 will go high resulting in a low output from inverter 75. With the low output from inverter 75 fed into NOR gate 76, conduction through transistor 77 will be controlled by the other input to NOR gate 76, the input connected to middle terminal 62 of the lower sensor 40. The absence of an object at lower horizontal level 42 will cause a low signal from second terminal 62 of lower sensor 40 to be input into NOR gate 76, causing the output to go high. Transistor 77 will conduct and close normally open relay 78 to cause the motor 28 to rotate the shafts 18 in order to raise the rack 25. Raising will continue until the uppermost portion of a top tray is sensed by lower sensor 40 to switch off the output of NOR gate 76, and thus turn off transistor 77.

The position of the rack 25 can also be raised or lowered manually by switches 81 or 82, respectively, which may be mounted to the side of housing 38 at a location not shown. According to the circuit depicted in FIG. 4, in the manual mode, switches 81 and 82 operate independently of each other, and should never be switched on simultaneously. On the other hand, in the automatic mode both switches should be on at the same time. The manual switches 81 and 82 are connected on one side to motor 28 via conductors 87 and 88, respectively. On the other side, in the manual mode, switches 81 and 82 are connected to an electrical conductor 89, which conveys power from a power connection point 94 at the motor 28 to housing 38. In the automatic mode, switches 81 and 82 are connected to conductors 86b and 86b, respectively. An electrical conductor 91 conveys power from the power connection point 94 at the motor to housing 38 for the automatic mode. Between the motor 28 and the housing 28, conductors 87, 88, 89 and 91 reside within conduit 36. The a.c. connections to the motor 28 are preferably routed from power connection points 93 and 94 via a power cord (not shown) to a standard 120 volt, 60 Hz power outlet.

The motor 28 is preferably an a.c. snychronous motor operated at a speed of 72 revolutions per minute, and capable of raising the rack 25 at a rate of about 12 inches per minute. A motor 28 capable of providing 750 ounce inches of torque has proved sufficient for this invention. D.C. power for the circuitry in housing 38 can be supplied either by batteries mounted therein or by rectified a.c. routed to the housing 38 through another conductor in conduit 36.

While I have described a preferred embodiment of an automatic self-leveling dish dispenser according to the invention, it is to be understood that the invention is not limited thereby and that, in light of the present disclosure of the invention, various other alternative embodiments will be apparent to a person skilled in the art. Accordingly, it is to be understood that changes may be made without departing from the scope of the invention as particularly set forth and claimed

We claim:

1. An electronic circuit for a self leveling dispenser, the dispenser having a rack vertically movable relative to ground, and being adapted to support a desired number of trays in stacked arrangement one on top of the other, said circuit comprising:
   a sensing device located above said rack, said device functioning to sense the presence and absence of trays at the vertical location of said sensing device, and
   a reversible motor electrically connected to said sensing device and drivably connected to said rack, said sensing device and said motor cooperatively functioning to automatically and continuously reposition said rack as required so that a top tray on said rack will be located at a desired dispensing height relative to ground.

2. A circuit in accord with claim 1, said sensing device further comprising:
   an upper sensor located at an upper level, said upper sensor being adapted to provide a down signal to said motor to vertically lower said rack upon the detection of a tray at said upper level, and
   a lower sensor located at a lower level, said lower sensor being adapted to provide an up signal to said motor to vertically raise said rack upon detecting the absence of a tray at said lower level,
   said desired dispensing height being defined by the vertical position of said upper and lower sensors.

3. A circuit in accord with claim 2 said upper and lower sensors being electrically connected to said motor in a manner which prevents the simultaneous occurrence of the up and the down signal.

4. A circuit in accord with claim 2, said circuit further comprising
   a timer operatively connected to said upper and lower sensors to delay transmission of said up and down signals to said motor for a predetermined time period, thereby preventing vertical movement of the rack upon detecting presence and absence within any transient time period less than said predetermined time period.

* * * * *